United States Patent [19]

Desplanches et al.

[11] 4,384,840
[45] May 24, 1983

[54] APPARATUS FOR MOLDING TUBULAR PARTS BY ISOSTATIC COMPRESSION

[75] Inventors: Gérard Desplanches, Palaiseau; Jacques Leboucq, Sainte Genevieve des Bois, both of France

[73] Assignee: Societe Anonyme dite: Compagnie Generale d'Electricite, Paris, France

[21] Appl. No.: 250,250

[22] Filed: Apr. 2, 1981

[30] Foreign Application Priority Data

Apr. 14, 1980 [FR] France .................................. 80 08263

[51] Int. Cl.³ ............................................... B30B 5/02
[52] U.S. Cl. ................................................ 425/405 H
[58] Field of Search .................................... 425/405 H

[56] References Cited

U.S. PATENT DOCUMENTS

| | | | |
|---|---|---|---|
| 2,999,780 | 9/1961 | Penault | 425/405 H X |
| 3,193,900 | 7/1965 | Wendt | 425/405 H |
| 3,239,591 | 3/1966 | Wendt | 264/314 |
| 3,523,502 | 8/1970 | Edwards | 425/405 H X |
| 3,588,080 | 6/1971 | Wallick | 425/405 H X |
| 3,824,051 | 7/1974 | Van Leemput | 425/405 H X |
| 4,056,347 | 11/1977 | Trolle | 425/405 H |

Primary Examiner—Howard Flint, Jr.
Attorney, Agent, or Firm—Kenyon & Kenyon

[57] ABSTRACT

An outer casing (1) and an inner mandrel (2), both of which are cylindrical and are substantially coaxial, with powder (3) for manufacturing the tubular parts (11) filling the space which lies between them, contain a stationary distance piece (5) disposed against a shoulder (4) formed in the upper portion of the mandrel (2) and around the upper portion. A cover (6) also is provided around the upper portion and bears firstly against the upper end of the stationary distance piece (5) and secondly against the end of the casing (1), the cover (6) being hollowed out so as to provide an annular space (7) around the stationary distance piece (5), a moving distance piece (8) being disposed in the space (7) and bearing against the surface of the powder (3) so that during isostatic compression, the upper end of the moulded part (11) can extend into the space (7) while driving the moving distance piece (8).

The apparatus can be used to manufacture beta sodium alumina tubes suitable for use as solid electrolytes in sodium-sulphur electric cells.

8 Claims, 2 Drawing Figures

APPARATUS FOR MOLDING TUBULAR PARTS BY ISOSTATIC COMPRESSION

The present invention relates to apparatus for moulding tubular parts by isostatic compression, said apparatus including an outer casing and an inner mandrel both of which are cylindrical and are substantially co-axial, the powder for manufacturing the tubular parts filling the space which lies between said casing and said mandrel.

BACKGROUND OF THE INVENTION

Moulding by isostatic compression is a well-known technique in particular in the field of ceramics where it is used in combination with conventional methods of compression moulding and slip cast moulding.

The technique consists mainly in inserting powder in a suitable mould which is sealed then immersed in a liquid. The liquid is then subjected to high pressure by any suitable means. The resulting hydrostatic pressure is therefore transmitted to the powder by the walls of the mould and a moulded blank is thus formed which is then sintered to obtain the hard ceramic part.

However, a number of difficulties are encountered when using this technique.

In particular, in the case where tubes are to be manufactured, powder is inserted between the outer casing of the mould and a mandrel and the method described is used.

Now, on stripping the casting, it is observed that the part obtained extends slightly beyond the upper end of the mould where it can even break.

To overcome this drawback, a method has been proposed in which a cover is disposed at the upper end of the mould, between the outer casing and the mandrel and to provide the cover with an O ring designed to bear against said casing. Then, when the moulded tube extends beyond the upper end of the mould, said cover can slide between these two parts. However, the results of such a solution are not very satisfactory.

Preferred embodiments of the present invention provide a moulding apparatus for manufacturing tubular parts under hydrostatic pressure while avoiding breaking these parts and affording perfect sealing with respect to the surrounding liquid.

SUMMARY OF THE INVENTION

The invention provides apparatus for moulding tubular parts by isostatic compression, said apparatus including an outer casing and an inner mandrel both of which are cylindrical and are substantially co-axial, the powder for manufacturing parts (in particular, tubular parts) filling the space which lies between said casing and said mandrel, and further including a stationary distance piece disposed against a shoulder formed in the upper portion of said mandrel and around said upper portion, a cover also being provided around said upper portion and bearing firstly against the upper end of said stationary distance piece and secondly against the end of said casing, said cover being hollowed out so as to provide an annular space around said stationary distance piece, a moving distance piece being disposed in said annular apace and bearing against the surface of said powder so that during isostatic compression, the upper end of the moulded part can extend into said annular space while driving said moving distance piece.

BRIEF DESCRIPTION OF THE DRAWING

A preferred embodiment of the invention is described in greater detail hereinbelow with reference to the accompanying drawing in which.

DETAILED DESCRIPTION

Figure 1:
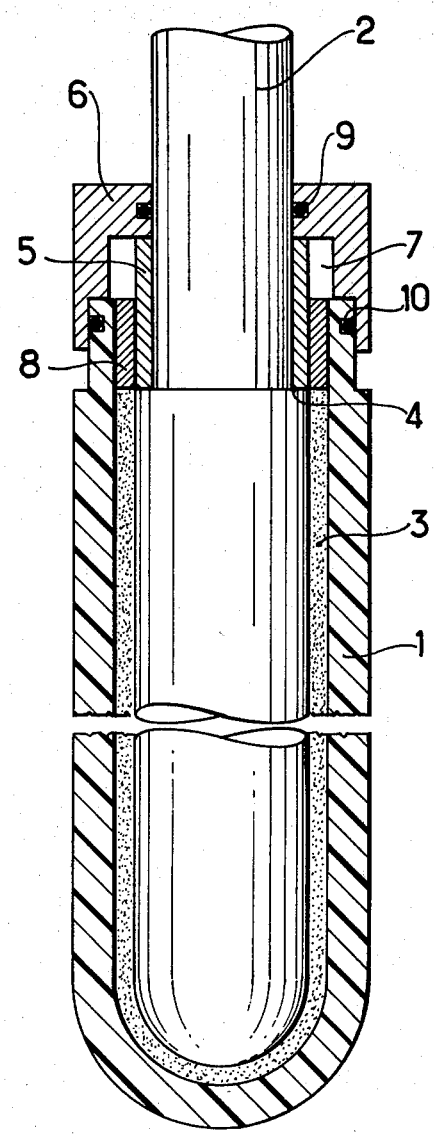
FIG. 1 illustrates the isostatic compression moulding apparatus in accordance with the invention before pressure is applied.

FIG. 1 illustrates apparatus in accordance with the invention for moulding tubes by isostatic compression.

It includes an outer casing 1 and an inner mandrel 2, both of which are cylindrical.

The space between these two components is filled with powder 3 to manufacture the part.

Said casing 1 is made of a polyurethane resin while the mandrel 2 is made of stainless steel or surface-treated duralumin.

The diameter of the upper part of the mandrel 2 is smaller than that of the remaining part so that a shoulder 4 is provided between the two parts. A stationary distance piece 5 made of stainless steel is disposed against this shoulder. Further, a brass or stainless steel cover 6 is disposed round the end of the mandrel 2 and bears firstly against the upper end of the distance piece 5 and secondly against the end of the casing 1. The cover 6 is hollowed out so as to provide an annular space 7 round the stationary distance piece 5.

Also, a stainless steel moving distance piece 8 is disposed in said space 7 round the stationary distance piece 5 and presses against the powder 3.

Lastly, the figures show a seal ring 9 disposed between the cover 6 and the upper end of the mandrel 2 and a seal ring 10 disposed between the cover 6 and the casing 1.

The apparatus in accordance with the invention operates as follows.

Once the powder 3 is inserted between the casing 1 and the mandrel 2, the moving distance piece 8 is disposed as illustrated in FIG. 1, then the whole is closed by means of the cover 6. The apparatus is then immersed in a liquid such as glycerol which is then subjected to hydrostatic pressure in a known manner.

Figure 2:
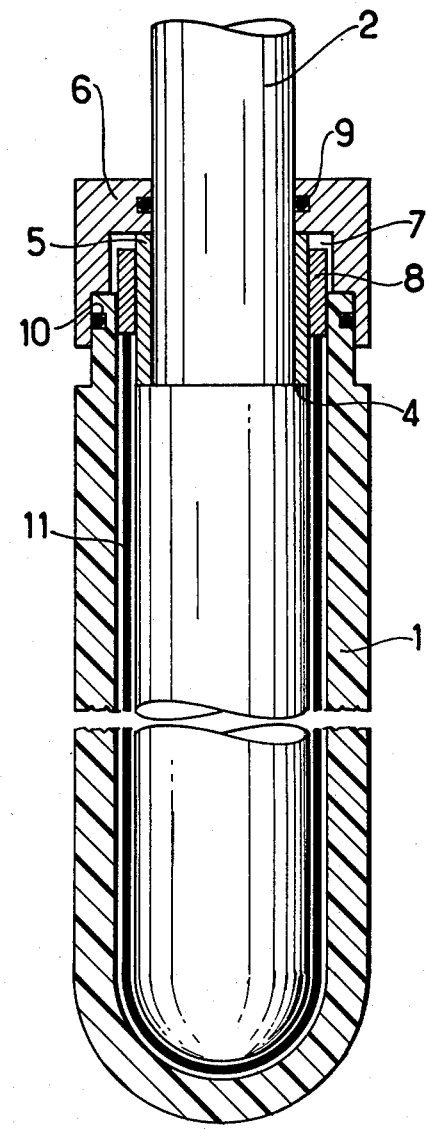
FIG. 2 illustrates said apparatus after decompression.

After decompression (see FIG. 2) the powder 3 is moulded into the shape of a tube 11 whose upper end extends into the annular space 7 with the tube 11 pushing the moving part 8 into said space. In this way, the tube 11 is allowed free play in the space 7 to prevent breakage of the part.

Further, the space 7 prevents air from being trapped round the part, and the thickness of the tube moulded is uniform, in particular at its end. This dispenses with subsequent heavy machining of the part.

It should also be observed that use of the cover 6 and, in particular of the stationary distance piece, affords perfect sealing with respect to the outside liquid when pressure is applied.

The invention is advantageously used to produce beta sodium alumina parts which are suitable for use as solid electrolytes in sodium-sulphur electric cells.

Very long, i.e. 500 mm, tubes have been made which were not deformed.

We claim:

1. Apparatus for use in molding a tubular part by isostatic compression, the apparatus including a tubular casing having a cylindrical inner surface and an open end, and a cylindrical mandrel having an outer diameter smaller than the cylindrical inner surface of the tubular casing and being adapted to be disposed coaxially in radially spaced relation inside the casing, with one end of the mandrel extending outwardly from the open end of the casing, whereby an annular space is provided between the mandrel and the casing, the annular space between the mandrel and the casing being adapted to be filled to a predetermined location spaced inwardly from the open end of the casing with a powdered material suitable to be compressed to form such a tubular part, wherein the improvement comprises:

a stop positioned on the mandrel adjacent to the open end of the casing when the mandrel is disposed within the casing in position for forming such a part;

a cover having a hole therethrough sized to slidingly fit on said one end of the mandrel, said stop being located on the mandrel such that the cover simultaneously abuts the stop and the open end of the tubular casing when the mandrel is in the molding position; and a cylindrical spacer ring having an inner diameter slidably engaging the outer diameter of the mandrel and an outer diameter slidably engaging the inner surface of the tubular casing, the spacer ring being positioned adjacent the open end of the casing such that when one end of the spacer ring bears against powdered material filling the annular space between the mandrel and the casing to said predetermined location preparatory to isostatic molding of a tubular part, the other end of the spacer ring is spaced axially from the cover so that an annular expansion space is provided between the other end of the spacer ring and the cover to permit said powdered material to push the spacer ring along the mandrel toward the cover during isostatic compression of the powder between the tubular casing and the mandrel, whereby the spacer ring maintains a square edge and a desired wall thickness of a tubular part during isostatic compression molding of such a part.

2. Apparatus according to claim 1 wherein the one end of said mandrel is formed with a reduced diameter, and said stop comprises an annular shoulder extending radially between said reduced diameter and said outer diameter of the mandrel.

3. Apparatus according to claim 1 wherein the one end of said mandrel is formed with a stepped diameter reduction which extends from said one end to a shoulder located on the other side of the said stop position, the apparatus further comprising a tubular distance piece mounted on the reduced diameter portion of the mandrel with one end of the distance piece abutting said shoulder and the other end of the distance piece forming said stop, the outer diameter of said distance piece being equal to said outer diameter of the mandrel.

4. Apparatus according to claim 1 wherein said cover includes a counterbored portion having an inner surface which slidably engages the outer surface of the tubular casing adjacent the open end of said casing, the apparatus further comprising a first seal ring disposed between the mandrel and the cover and a second seal ring disposed between the inner surface of said counterbored portion and the outer surface of the tubular casing.

5. Apparatus according to claim 1 or 4 wherein said mandrel, cover, and spacer ring are made of metal, and said tubular casing is made of a plastics substance which is capable of transmitting isostatic compression forces to powdered material filling the annular space between the casing and the mandrel when the apparatus is immersed in a pressurized liquid.

6. Apparatus according to claim 5 wherein said mandrel is made from a metal selected from the group consisting of stainless steel and duraluminum, said cover is made of a metal selected from the group consisting of stainless steel and brass, and said spacer ring is made of stainless steel.

7. A tubular part made of compressed beta alkalin alumina powder produced using the apparatus according to claim 1.

8. A method for molding a tubular part by isostatic compression, the method including filling an annular space between a tubular casing and a cylindrical mandrel disposed coaxially within the casing with a powdered material to adjacent an open end of the casing, sealably closing the open end of the casing so as to leave an annular expansion space between the powdered material and the sealed end of the casing, and producing relative radial movement between the outer surface of the mandrel and the inner surface of the casing to isostatically compress the powdered material such that the powdered material is forced axially into said annular expansion space, wherein the improvement comprises:

slidingly fitting a cylindrical spacer ring between the outer surface of the mandrel and the inner surface of the tubular casing to bear against said powdered material prior to closing the open end of the casing, the ring having a length less than the axial dimension of said annular extension space, whereby the spacer ring maintains a uniform thickness of the powdered material which is forced into the annular expansion space during the isostatic compression step.

* * * * *